United States Patent [19]

Vodicka

[11] 4,003,970
[45] Jan. 18, 1977

[54] COMBINED WET AND DRY HEAT TRANSFER SYSTEM AND METHOD FOR COOLING TOWERS

[75] Inventor: Vladimir Vodicka, Bochum, Germany

[73] Assignee: Balcke-Durr Aktiengesellschaft, Ratingen, Germany

[22] Filed: Oct. 28, 1975

[21] Appl. No.: 626,538

[30] Foreign Application Priority Data

Nov. 2, 1974 Germany .......................... 2452123

[52] U.S. Cl. ............................... 261/159; 261/111; 261/146; 261/DIG. 11; 261/DIG. 77
[51] Int. Cl.[2] ....................... F28D 5/02; F28C 1/02
[58] Field of Search .......... 261/111, 112, 138, 146, 261/158–161, DIG. 11, DIG. 77; 165/DIG. 1, 1, 117

[56] References Cited

UNITED STATES PATENTS

| | | | |
|---|---|---|---|
| 2,157,070 | 5/1939 | Coey | 261/DIG. 11 |
| 3,782,451 | 1/1974 | Cates | 261/DIG. 77 |
| 3,846,519 | 11/1974 | Spangemacher | 261/DIG. 77 |
| 3,865,911 | 2/1975 | Lefevre | 261/DIG. 77 |

FOREIGN PATENTS OR APPLICATIONS

| | | | |
|---|---|---|---|
| 2,220,167 | 11/1973 | Germany | 261/111 |
| 2,251,709 | 5/1973 | Germany | 261/DIG. 11 |

*Primary Examiner*—Tim R. Miles
*Assistant Examiner*—Gregory N. Clements
*Attorney, Agent, or Firm*—Joseph A. Geiger

[57] ABSTRACT

An adjustably operable heat transfer system for cooling tower installations, the heat transfer units consisting of a section of only "wet" operating evaporative heat exchanger units and a section of dual-purpose heat exchanger units which are adapted for alternative or simultaneous wet evaporative heat transfer and "dry" convective heat transfer. All units are operated in the wet mode, when the air temperatures are highest, for maximum heat transfer output, but a mixed mode is used, when the air temperature is lowest, dry warm air obtained through convective heat transfer being admixed to the moist warm air obtained through evaporative heat transfer, in order to prevent cloud formation by the latter.

15 Claims, 6 Drawing Figures

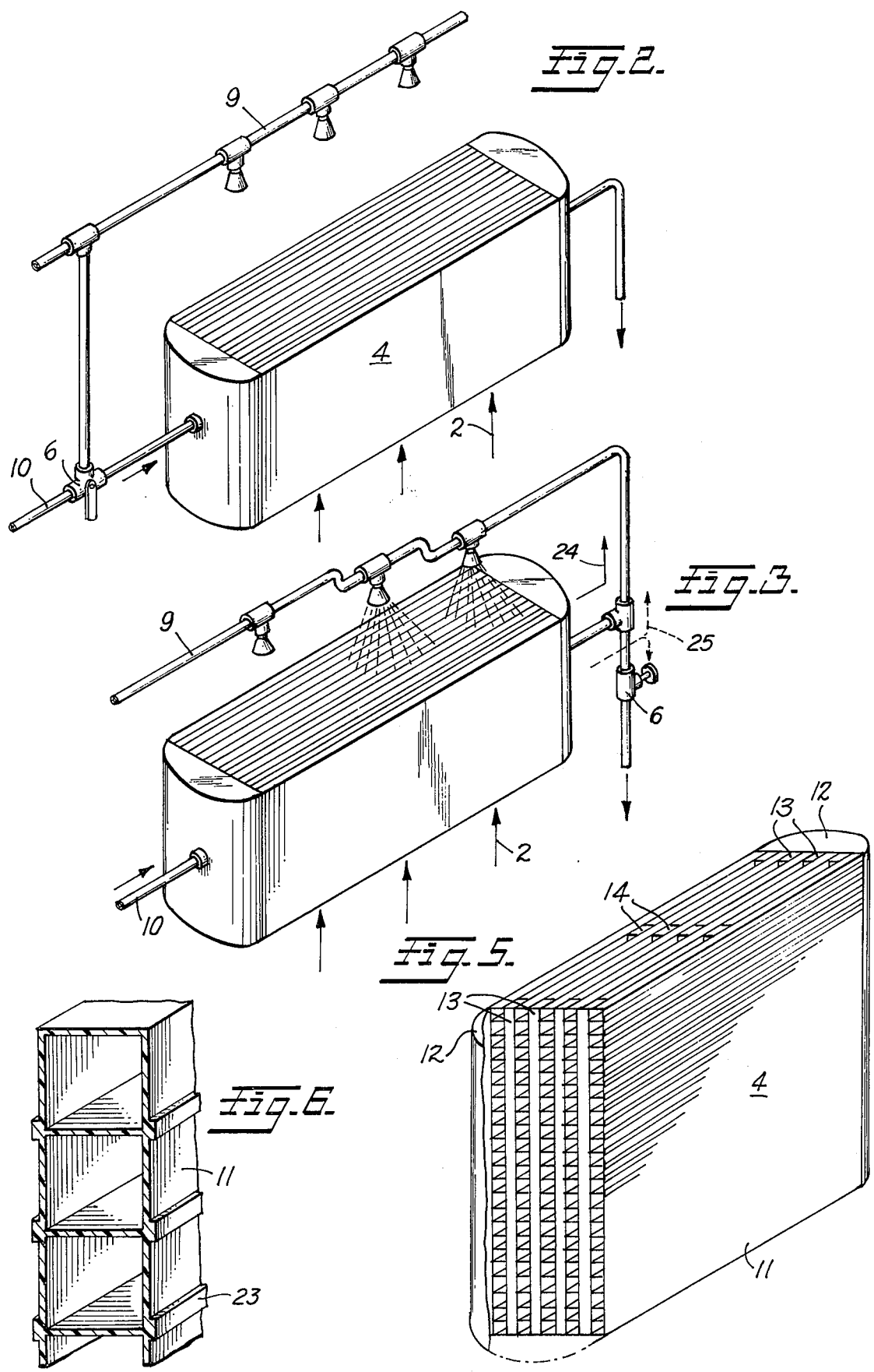

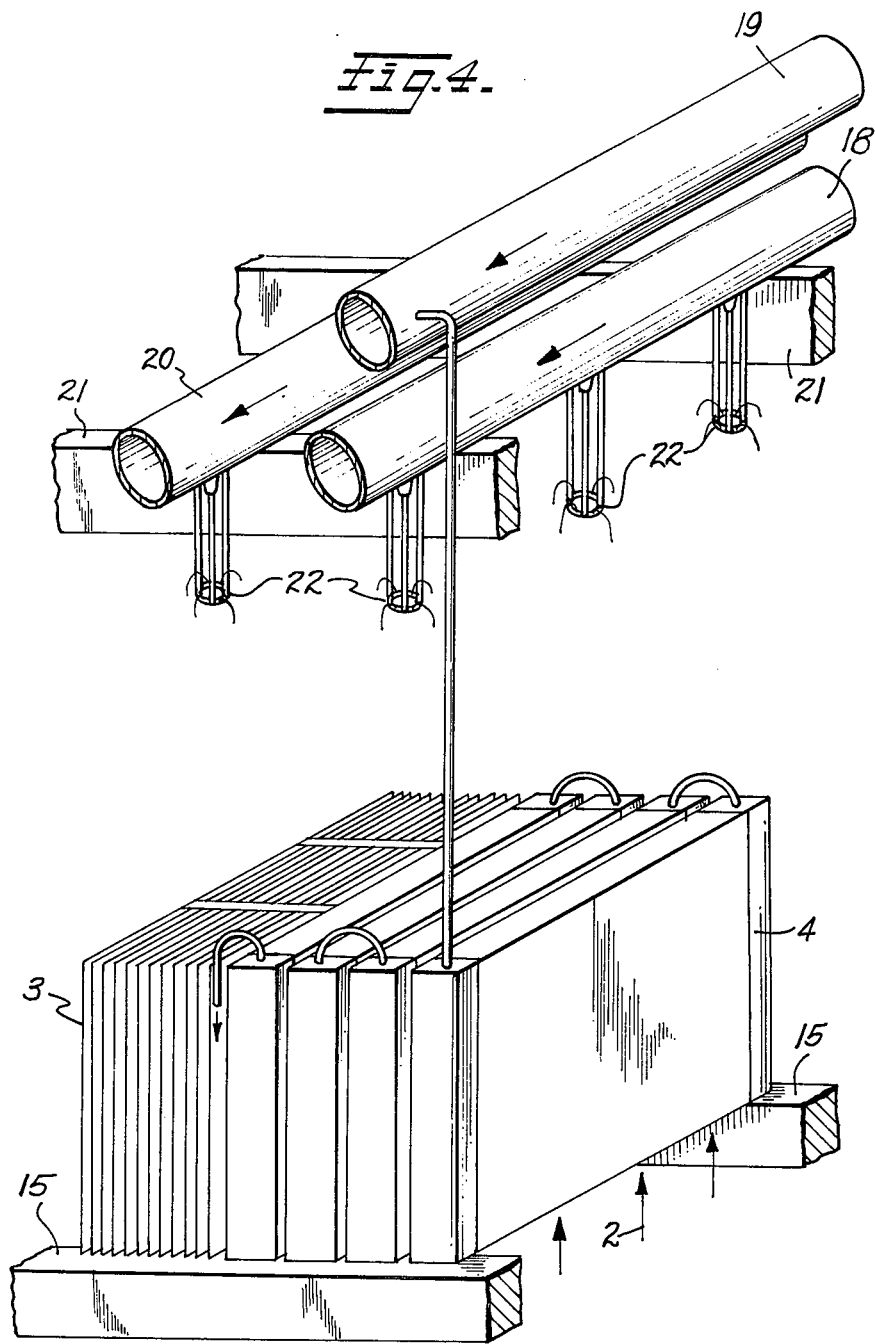

COMBINED WET AND DRY HEAT TRANSFER SYSTEM AND METHOD FOR COOLING TOWERS

BACKGROUND OF THE INVENTION

1. Field of the Invention

The present invention relates to cooling tower installations, and more particularly to heat transfer systems employed in conjunction with cooling towers of the natural draft type or of the forced draft type using both indirect convective heat transfer in a so-called dry section of the installation and direct evaporative heat transfer in a so-called wet section of the installation.

2. Description of the Prior Art

A cooling tower installation of this kind is disclosed in U.S. Pat. No. 3,846,519, for example. There, the heat exchanger units of the dry section are operated only in the dry, i.e. convective, mode and the heat exchanger units of the wet section are operated only in the wet, i.e. evaporative mode. The size and number of heat exchanger units are consequently determined by the required maximum cooling output in the hot season, on the one hand, and by the need for cloud-free operation during the cold season, on the other hand. It is known that the formation of vapor clouds at low temperatures can be avoided by admixing to the moisture laden air which emerges from the wet heat transfer section of the cooling installation the warm dry air which is obtained from its dry section, after the initially cold air has been heated through convective heat transfer. In these known installations, therefore, the size of the dry section is determined by the parameters which apply to the cloud-free operation in winter, while the size of the wet section of the installation is essentially determined by the cooling output specified for the installation under extreme conditions. It follows from this that installations of this known type have to be rather large in their dimensions, having a much steeper performance curve than a cooling tower of the purely wet type.

It has also already been suggested to sprinkle water over the outer surfaces of heat exchanger units which normally are intended for convective heat transfer to the air, in order to increase the heat transfer output of these units at times when the temperature of the surrounding air is high. The water which is to be cooled still passes through the heat exchanger elements, while the latter are sprayed with either newly added water or with previously cooled water taken from the water circulation system. Another known system suggests that the water which is sprinkled over the heat exchanger elements be recirculated, being drawn from a collecting trough by means of a pump feeding it to a sprinkler system (German Offenlegungsschrift (Publ. Application) No. 2,251,709). Additional prior art suggestions can be found in the German Offenlegungsschrift No. 2,220,167 and in U.S. Pat. Nos. 2,157,070 and 2,890,864.

The units which are used for convective heat transfer between the air and the liquid cooling medium normally have finned heat exchanger pipes of a material having a high heat conductivity. These pipes are therefore either not corrosion resistant, or, if they are made of a corrosion resistant material, are very expensive. For this reason, there has recently developed a tendency to utilize heat exchanger units fabricated from plastic materials. It is well known, however, that plastic materials have a very poor heat conductivity and a comparatively low mechanical strength, so that heat exchanger units made from plastic materials require increased minimum wall thicknesses which, in turn, noticeably increase the thermal resistance across these walls. Consequently, when compared with conventional metallic heat exchanger units, the thermal resistance of plastic heat exchanger units is higher by as much as the second of third power, meaning that the heat transfer coefficient, which together with the required overall output of the system determines the total area of heat transfer surfaces needed, is correspondingly reduced.

SUMMARY OF THE INVENTION

Underlying the present invention is the primary objective of improving the combined wet and dry heat transfer system for cooling towers in such a way that the shortcomings of the known installations are eliminated or obviated as far as possible. The improved cooling tower installation is to be capable of cloud-free operation, even at very low temperatures, with a less steep performance characteristic than similar prior art cooling installations. The system should also allow for the use of plastic heat exchanger units, while avoiding that their higher thermal resistance adversely effects the output performance of the system.

Accordingly, in a combined wet and dry heat transfer system for cooling tower installations which has units designed for convective heat transfer as well as units with sprinkling means for evaporative cooling, where the heat exchanger units are arranged at a distance above the foundation of the cooling tower, occupying substantially the entire cross-sectional area of the latter, and where the cooling air draft enters radially between the ground and the heat exchanger units flowing upwardly through the latter, the present invention suggests that a portion of the total surface area of the heat exchanger units be of the wet type, serving exclusively for direct and evaporative heat transfer, while the remaining portion of the heat transfer surfaces is designed for a dual purpose, to serve entirely or in part both for indirect convective heat transfer and for direct evaporative heat transfer, and the heat exchanger units of the second type are preferably flow channel structures manufactured of plastic material.

Rather surprisingly, it has now been found that a combination of heat exchanger units with heat transfer surfaces subdivided into wet and dry sections in accordance with this invention makes is possible to reduce the overall size of the cooling tower to dimensions which differ only slightly from those of a conventional evaporative or wet cooling tower.

The combined wet and dry heat transfer system of the present invention is operated in such a way that the ratio between the wet surface areas and the dry surface areas is varied in relation to the air temperature, in order to obtain a cloud-free operation at all air temperature levels, while optimizing the heat transfer output and minimizing the amount of new water which has to be added to the system to replace the water which is being evaporated. The operation of this novel type of cooling tower installation as a cloud-free cooling system results in a less steep performance curve of the installation, when compared to known prior art cooling tower installations of the combined wet and dry type.

The present invention thus proposes a heat transfer system in which a number of heat exchanger units are operable both in a convection mode and in an evaporation mode, the medium to be cooled flowing through the units in the dry convection mode, or flowing over the outer surfaces of the units in the wet evaporation mode. These special heat exchanger units will in the following be referred to as dual-purpose units, in contrast to the purely wet evaporation units, where only direct heat transfer to the air and simultaneous evaporative heat absorption take place.

According to a preferred embodiment of the present invention, it is further suggested that the air to which the heat is to be transferred passes through the wet and dry sections of the cooling system in parallel flows, the hot liquid medium which is to be recooled flowing through the wet and dry operating sections of the system either in parallel flows or in a series-type flow, in which the medium is first cooled in the dry mode and then recooled in the wet mode.

While the prior art system disclosed in U.S. Pat. No. 2,157,070 suggests that a portion of the liquid to be cooled undergoes evaporative cooling and another portion undergoes cooling through convective heat transfer across the heat exchanger walls to the evaporatively cooled liquid, the cooling system of the present invention provides that, when the dual-purpose units are operated in the wet mode, the entire flow of water, which previously would have passed through the heat exchanger units, is now distributed over the outer surfaces of these units. Accordingly, the cooling system of the invention operates in the purely wet mode, without any water flowing through any heat exchanger units, if the water circulation through the system is of the above-mentioned parallel type. If, however, the water circulation system of the invention is desired to be of the series-type, then the water first passes through the dual-purpose units, whereupon part of the water is cooled on the purely wet units and another part is cooled on the surfaces of those dual-purpose units that are operated in the wet mode. In this latter part of the cooling operation, the cooling action takes place on the surface of a dropping water curtain. This aspect is particularly significant in connection with dual-purpose heat exchanger units of plastic material, where, in the wet operating mode, the comparatively high thermal flow resistance of the dual-purpose units need not be overcome, because a direct transfer of heat to the air takes place. This makes it possible to achieve considerably higher heat transfer output values than would be obtainable with the known modes of operation, where the water is sprinkled onto the heat exchanger surfaces and the heat has to be transported through the wall of the heat exchanger elements.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows:

FIG. 2 shows in a schematic illustration a dual-purpose heat exchanger unit of the invention in conjunction with a proposed flow circuit;

FIG. 3 shows a heat exchanger unit similar to that of FIG. 2, with a modified flow circuit;

FIG. 4 shows in a likewise schematic representation a proposed arrangement of dual-purpose heat exchanger units, arranged alongside evaporative cooling units of the wet section of the installation, including a corresponding water distribution system, as suggested by the invention;

FIG. 5 shows a partially cross-sectioned dual-purpose heat exchanger unit in a perspective view; and FIG. 6 shows an enlarged detail of the heat exchanger unit of FIG. 5.

DESCRIPTION OF THE PREFERRED EMBODIMENT

Figure 1:
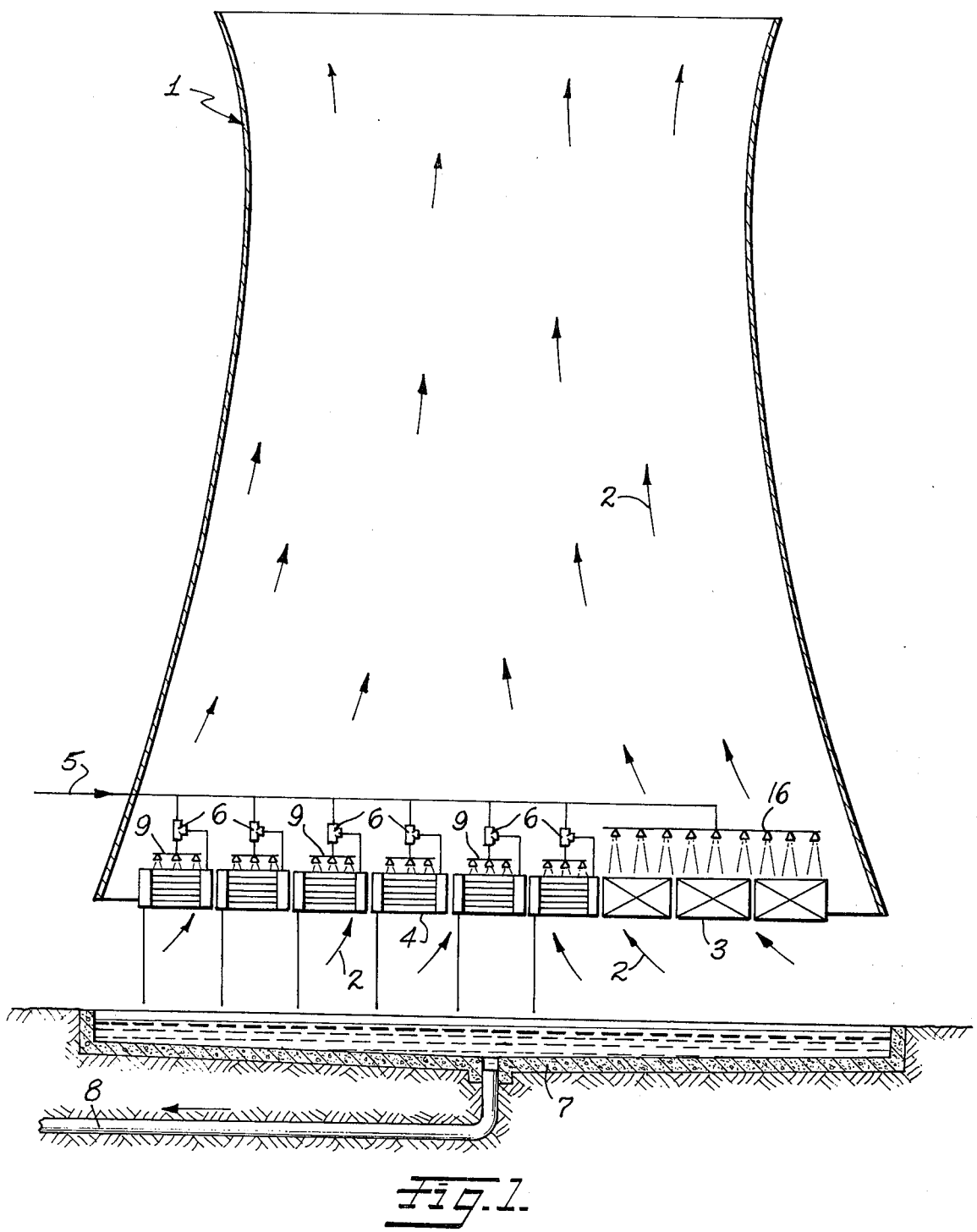
FIG. 1 shows in a schematic representation a combined wet and dry cooling tower heat transfer system embodying the invention.

Referring to FIG. 1 of the drawing, there is shown schematically a cooling tower installation of the natural draft type, a cooling tower mantle 1 being mounted at a distance above the ground so as to provide lateral openings for the entry of air which flows in the direction of the arrows 2, under the effect of a natural draft induced inside the tower mantle 1. The entering air flow passes upwardly through banks of heat exchanger units 3 and 4 which occupy essentially the entire cross-sectional area enclosed by the cooling tower, just above the peripheral opening underneath the tower mantle 1. The warm air emerging from the heat exchanger units rises inside the cooling tower, leaving it through the open upper end, as a result of the natural draft created by the expansion of the heated air.

The heat exchanger units of the heat transfer system consist of two different types of units: so-called wet units 3, and dual-purpose units 4. The hot water from which heat is to be removed through cooling is pumped to the cooling tower through a main supply conduit 5 which is arranged above the heat exchanger units. The main conduit 5 leads to a water distribution system which includes a conduit branch leading to a sprinkler system 16 arranged just above the wet cooling units 3 and other branch conduits leading to the dual-purpose units 4, via adjustable control valves 6. Depending upon the adjustment position of the control valves 6, the water supplied to the dual-purpose units 4 is either passed through these units, in a dry operating mode, or flows to sprinklers 9 which distribute it onto the surfaces of the dual-purpose units 4 in a wet operating mode. This choice of operating modes is not available for the purely wet cooling units 3, where the water to be cooled is always sprinkled onto the units, regardless of the setting of the control valves 6. The cooled water exiting from the dual-purpose heat transfer units 4 and from the wet units 3 falls to a collecting basin 7 arranged below the units, where it is mixed and equalized in temperature, and then leaves the cooling tower through a return conduit 8. In case of a change in the air temperature, or when the heat transfer output is to be increased or decreased, a corresponding number of valves 6 are switched from the wet operating mode to the dry operating mode, or vice versa, in order to readjust the cooling range, or the temperature of the recooled water, respectively, in accordance with the prevailing conditions of the surrounding air.

In FIG. 2 is illustrated a single dual-purpose heat exchanger unit 4 with its connections to the water distribution system. The water which is to be cooled in the unit 4 arrives from a distribution point (not shown), through a supply conduit 10, flowing through the control valve 6 which directs the water either into the inner flow channels of the dual-purpose unit 4 or to the sprinkler bank 9 arranged above it. In the first case, the upwardly passing air flow 2 removes heat from the horizontally flowing water through indirect, convective heat transfer across the heat exchanger walls, after which the water drops to the collecting basin 7 (not shown). In the second case, both the water and the air flow 2 pass through the same spaces between the flow channels of the unit 4 in a vertical counter flow, some heat being transferred to the air through direct contact with the water and additional heat being removed from the water, as a small portion thereof is evaporated and entrained upwardly by the air flow. The recooled water is discharged downwardly from the unit 4, falling likewise into the collecting basin 7.

FIG. 3 shows the dual-purpose heat exchanger unit 4 of FIG. 2 with a modified version of a water sprinkler system. This embodiment provides for the water to arrive through the supply line 10 and to flow through the flow channels of the unit 4 prior to reaching the control valve 6 which determines the operating mode of the unit, by either allowing the cooled water to discharge downwardly into the collecting basin 7, or by forcing it to rise into the sprinkler bank 9, as indicated by arrow 24. The individual sprinklers of the sprinkler bank 9 are arranged in a vertically staggered fashion, so that, depending upon the setting of the valve 6, a varying number of sprinklers is being supplied with water and the dual-purpose heat exchanger unit 4 is operated partially in the wet mode and partially in the dry mode. The level to which the water will rise in the sprinkler bank 9, and the number of sprinklers which will accordingly receive water, thus depend on the quantity of water arriving through line 10 and on the quantity of water which is allowed to discharge downwardly through valve 6. This bifurcating flow is indicated by the arrow 25.

In FIG. 4 is illustrated a portion of the heat transfer system of the invention in that region of the assembly where the flow plates of the purely wet cooling units 3 adjoin the dual-purpose heat exchanger units 4. Both the dual-purpose unit 4 and the wet unit 3 are mounted on horizontal support beams 15. Above these units is arranged the water distribution system, consisting typically of the distribution pipes 18, 19, and 20. The latter are likewise carried by a horizontal support structure 21. The water pipes 18 which are associated with the dual-purpose heat exchanger units 4 and the water pipes 20 which are associated with the wet units 3 carry banks of sprinklers 22 which distribute the water onto the exposed surfaces of the corresponding heat exchanger units. Above each pipe 18 is arranged a pipe 19 which supplies water directly to the interior flow channels of each dual-purpose unit 4 for convective heat transfer. As is illustrated schematically in FIG. 4, it is further possible to arrange a series-type connection between adjacent dual-purpose units 4. Each pair of pipes 18 and 19 is controlled by a control valve 6 (not shown in FIG. 4), the latter directing the flow of water either to pipe 18, for a wet operation of the units 4, or to pipe 19, for a dry operation.

In FIGS. 5 and 6 are shown various constructional details of a dual-purpose heat exchanger unit 4, the wall of one of the two endwise connected water chambers 12 being cut away. A typical dual-purpose unit thus consists of a number of upright, transversely spaced heat exchanger panels 11, defining several vertically adjacent rectangular flow channels, as shown in FIG. 6. Laterally protruding ledges 23 increase the turbulence of the passing air. The hollow panels 11 are transversely connected by means of intermediate profiles 13 and spacers 14. Together with the water chambers 12 on both ends of the unit, into which the flow channels open on both ends, they form a sturdy heat exchanger unit which is easy to install.

It should be understood, of course, that the foregoing disclosure describes only a preferred embodiment of the invention and that it is intended to cover all changes and modifications of this example of this invention which fall within the scope of the appended claims.

I claim the following:

1. In a cooling tower installation for the continuous recooling of large quantities of hot cooling water through heat transfer from the water to an air draft generated inside a vertically open tower mantle, an adjustable combined wet and dry heat transfer system comprising in combination:

a plurality of heat exchanger units arranged adjacent to one another within the confines of the cooling tower mantle, so as to occupy substantially the entire cross-sectional area enclosed by the latter;

air flow spaces in the heat exchanger units for the upward passage of air flows through the heat exchanger units;

a water collecting basin arranged underneath the heat exchanger units;

conduit means for bringing a supply of hot water to the heat exchanger units;

a hot water distributing network disposed above the heat exchanger units, including means for distributing the hot water onto surfaces of the heat exchanger units which are also exposed to said air flows;

conduit means for removing the recooled water from the collecting basin; and wherein:

the heat exchanger units comprise a group of so-called wet units, which are operable only for the transfer of heat from downwardly moving flows of water originating from the water distributing network to said upwardly moving air flows, in direct contact therebetween and through evaporation of a portion of the water;

the heat exchanger units further comprise a group of dual-purpose heat exchanger units, having interior water flow channels connectable to said supply conduit means, the channels having walls across which heat is transferable to said upwardly moving air flows in a convective, so-called dry operation, the outer sides of said channel walls being further adapted to guide downwardly moving flows of water originating from the water distributing network, for an evaporative, wet operation; and the heat transfer system further comprises means for adjusting the vapor content of the heated air leaving the tower, for cloud-free operation, said means including valve and conduit means associated with the hot water supply for selectively operating the dual-purpose heat exchanger units in a dry or wet operating mode, or in both modes simultaneously, by correspondingly controlling the flow of hot water to the water channels inside the units and to the water distributing means arranged above the units.

2. A heat transfer system as defined in claim 1, wherein
the dual-purpose heat exchanger units are manufactured of plastic material.

3. A heat transfer system as defined in claim 2, wherein
each dual-purpose heat exchanger unit includes a plurality of transversely spaced substantially upright hollow panels defining a number of vertically adjacent substantially horizontal and endwardly open flow channels, the transverse spacing between said panels providing said air flow spaces; water chambers enclosing the open ends of the flow channels on both sides of the panels; and inlet line for hot water connected to one water chamber; and an outlet line for cooled water connected to the other water chamber.

4. A heat transfer system as defined in claim 3, wherein
the hollow panels of the dual-purpose heat exchanger units include laterally protruding ledges for the creation of turbulence in said air flow.

5. A heat transfer system as defined in claim 1, wherein
the cold air which is drawn into the cooling tower enters the wet heat exchanger units and the dry heat exchanger units simultaneously in a parallel-type flow system.

6. A heat transfer system as defined in claim 5, wherein
the hot water supply conduit means, the hot water distributing network, and said valve and conduit means are so interconnected that the dual-purpose heat exchanger units are operable in a parallel-type flow pattern in which a portion of the incoming hot water is cooled in the flow channels of the dual-purpose heat exchanger units, in a dry operative mode, while the remainder of the hot water is cooled on the surfaces of one or both types of heat exchanging units, in a wet operative mode.

7. A heat transfer system as defined in claim 5, wherein
the hot water supply conduit means, the hot water distributing network, and said valve and conduit means are so interconnected that the dual-purpose heat exchanger units are operable in a series-type flow pattern in which at least a portion of the incoming hot water is cooled in the flow channels of the dual-purpose heat exchanger units, in a dry operative mode, whereupon it is further cooled on the surfaces of said heat exchanger units, in a wet operative mode.

8. A heat transfer system as defined in claim 7, wherein
the hot water distributing network includes a sprinkler pipe with a bank of sprinklers arranged above each dual-purpose heat exchanger unit, the sprinklers being arranged at progressively higher levels in the direction of water flow;
said valve and conduit means include, on the outlet side of each dual-purpose unit, an outlet through which the convectively recooled water can be discharged to the collecting basin and a connecting pipe leading from the outlet side of each dual-purpose unit to its associated bank of sprinklers; and
said valve and conduit means further include an adjustable control valve in the discharge outlet of each dual-purpose unit by means of which at least a portion of the recooled water can be forced to rise through the connecting pipe into said sprinkler pipe, whereby the water pressure and the setting of the control valve determine the number of sprinklers through which said water passes.

9. A method of operating the heat transfer system of a cooling tower installation through which large quantities of hot cooling water are circulated, in order to be recooled by an air draft of which a first flow section passes upwardly through a group of only wet operating, evaporative heat exchanger units and a second air draft flow section passes through a group of dual-purpose heat exchanger units adapted for alternative or simultaneous wet evaporative heat transfer and dry convective heat transfer, the method comprising the steps of:
evaporatively cooling a portion of the hot water, by sprinkling it over the group of only wet operating heat exchanger units, where heat is transferred to said first air draft flow section; and
cooling the remainder of the water by means of the dual-purpose heat exchanger units, through heat transfer to said second air draft flow section;
recombining the two flow sections of the air draft before they leave the cooling tower; and
adjusting the ratio between the amount of heat transferred evaporatively in the wet mode and the amount of heat transferred convectively in the dry mode in such a way with respect to the atmosphere surrounding the cooling tower that the dry component of the recombined air draft will inhibit cloud formation by its wet vapor saturated component.

10. A method as defined in claim 9, wherein
the step of cooling the remainder of the water involves flowing at least a portion of said water through spaced flow channels in the dual-purpose heat exchanger units, for dry convective heat transfer across the walls of said flow channels to air from said second air draft section which passes between the flow channels.

11. A method as defined in claim 9, wherein
the step of cooling the remainder of the water involves the sprinkling of at least a portion of said water onto the outer surfaces of spaced flow channels of the dual-purpose heat exchanger units, for wet evaporative heat transfer to air from said second air draft section which passes between the flow channels.

12. A method as defined in claim 9, wherein
the step of cooling the remainder of the water involves flowing a first portion of said water through some of the dual-purpose heat exchanger units, through spaced flow channels thereof, for dry convective heat transfer across the walls of said flow channels to air from said second air draft section which passes between the flow channels, and sprinkling the remaining portion of said water over other dual-purpose heat exchanger units, onto the outer surfaces of spaced flow channels thereof, for wet evaporative heat transfer to air from said second air draft section which passes between the flow channels.

13. A method as defined in claim 9, wherein
the step of cooling the remainder of the water involves first flowing said water through dual-purpose heat exchanger units, through spaced flow channels thereof, for dry convective heat transfer across the walls of said flow channels, and then sprinkling at least some of this convectively cooled water over at least some of said dual-purpose units, onto the outer surfaces of their flow channels, for further wet evaporative heat transfer to air from said second air draft section which passes between the flow channels.

14. A method as defined in claim 13, wherein said step of sprinkling involves the sprinkling of convectively cooled water over the dual-purpose heat exchanger units in such a way that less than the entire available surface area of the individual heat exchanger units is utilized for evaporative heat transfer.

15. A method as defined in claim 9, wherein prior to the wet evaporative cooling of a portion of the hot water in the wet only group of heat exchanger units, the entire supply of hot water is first flowed through the group of dual-purpose heat exchanger units, for intial dry convective heat transfer.

* * * * *